United States Patent
Chen et al.

(10) Patent No.: US 12,095,404 B2
(45) Date of Patent: Sep. 17, 2024

(54) MOTOR FORWARD AND REVERSE ROTATION DETECTOR AND MOTOR DRIVER HAVING MOTOR FORWARD AND REVERSE ROTATION DETECTOR

(71) Applicant: ANPEC ELECTRONICS CORPORATION, Hsinchu (TW)

(72) Inventors: Kun-Min Chen, Hsinchu (TW); Shih-Hai Chien, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 138 days.

(21) Appl. No.: 17/972,566

(22) Filed: Oct. 24, 2022

(65) Prior Publication Data

US 2024/0072695 A1    Feb. 29, 2024

(30) Foreign Application Priority Data

Aug. 29, 2022    (TW) .................................. 111132394

(51) Int. Cl.
*H02P 6/22* (2006.01)
*H02K 11/215* (2016.01)
*H02P 6/30* (2016.01)

(52) U.S. Cl.
CPC .............. *H02P 6/22* (2013.01); *H02K 11/215* (2016.01); *H02P 6/30* (2016.02)

(58) Field of Classification Search
CPC ...... H02P 6/22; H02P 6/30; H02P 6/16; H02P 6/182; H02K 11/215

USPC ................ 318/400.09, 400.01, 700
See application file for complete search history.

(56) References Cited

U.S. PATENT DOCUMENTS

| | | | |
|---|---|---|---|
| 7,486,041 B2 * | 2/2009 | Wasson ..................... | H02P 6/15 318/434 |
| 7,592,764 B2 * | 9/2009 | Vermeir .................. | H02P 6/182 318/489 |
| 7,821,217 B2 * | 10/2010 | Abolhassani ........... | H02P 6/153 318/809 |
| 10,256,701 B2 * | 4/2019 | Chen ........................ | H02P 6/30 |

* cited by examiner

*Primary Examiner* — David Luo
(74) *Attorney, Agent, or Firm* — Li & Cai Intellectual Property Office

(57) ABSTRACT

A motor forward and reverse rotation detector and a motor driver having the motor forward and reverse rotation detector are provided. A rotor position detecting circuit detects a position of a rotor of a motor to output a commutation signal. A forward and reverse rotation detecting circuit detects a back electromotive force of the motor to output a back electromotive force detected signal. The forward and reverse rotation detecting circuit, according to a phase relationship and a phase difference between the back electromotive force detected signal and the commutation signal, determines which one of a forward direction and a reverse direction is a rotational direction of the motor to output a rotational direction detected signal. A motor driving circuit drives the motor according to the rotational direction detected signal.

13 Claims, 7 Drawing Sheets

MOTOR FORWARD AND REVERSE ROTATION DETECTOR AND MOTOR DRIVER HAVING MOTOR FORWARD AND REVERSE ROTATION DETECTOR

CROSS-REFERENCE TO RELATED PATENT APPLICATION

This application claims the benefit of priority to Taiwan Patent Application No. 111132394, filed on Aug. 29, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor driver, and more particularly to a motor forward and reverse rotation detector and a motor driver having the motor forward and reverse rotation detector.

BACKGROUND OF THE DISCLOSURE

In electronic devices, fans are used to cool heat generating components such as processors. When the heat generating components are cooled down by the fans, data from circuits of the fans must be instantly obtained so as to precisely start up motors of the fans and to control their rotational speeds according to the obtained data. In particular, operations performed on the motor rotating in a reverse direction against the wind must be different from operations performed on the motor rotating in a forward direction along the direction of the wind, thereby adjusting the rotational speed of the motor such that the fan can properly cool down the heat generating components with efficiency.

SUMMARY OF THE DISCLOSURE

In response to the above-referenced technical inadequacies, the present disclosure provides a motor forward and reverse rotation detector, which is applicable for detection of a motor. The motor forward and reverse rotation detector includes a rotor position detecting circuit and a forward and reverse rotation detecting circuit. The rotor position detecting circuit is disposed on the motor. The rotor position detecting circuit is configured to detect a position of a rotor of the motor to output a commutation signal. The forward and reverse rotation detecting circuit is connected to the rotor position detecting circuit and the motor. The forward and reverse rotation detecting circuit is configured to detect a back electromotive force signal to generate a back electromotive force detected signal. The forward and reverse rotation detecting circuit, according to a phase relationship and a phase angle difference between the back electromotive force detected signal and the commutation signal, determines which one of a forward direction and a reverse direction is a rotational direction of the motor to output a rotational direction detected signal.

In certain embodiments, the forward and reverse rotation detecting circuit detects the back electromotive force signal of one or more of a plurality of terminals of the motor to generate the back electromotive force detected signal.

In certain embodiments, the motor is a single-phase motor and the plurality of terminals of the motor includes a first terminal and a second terminal.

In certain embodiments, the rotor position detecting circuit includes a Hall sensor and a Hall position detecting circuit. The Hall sensor is disposed on the motor. The Hall sensor is configured to sense a positive voltage and a negative voltage that are generated with a change in magnetic field strength from rotation of the rotor of the motor to respectively output a first Hall signal and a second Hall signal. The Hall position detecting circuit is connected to the Hall sensor and the forward and reverse rotation detecting circuit. The Hall position detecting circuit is configured to output the commutation signal to the forward and reverse rotation detecting circuit according to the first Hall signal and the second Hall signal.

In certain embodiments, the forward and reverse rotation detecting circuit includes a back electromotive force detecting circuit and a forward and reverse rotation determining circuit. The back electromotive force detecting circuit is connected to the motor. The back electromotive force detecting circuit is configured to detect the back electromotive force signal to output the back electromotive force detected signal. The forward and reverse rotation determining circuit is connected to the back electromotive force detecting circuit. The forward and reverse rotation determining circuit, according to the phase relationship and the phase angle difference between the back electromotive force detected signal and the commutation signal, determines which one of the forward direction and the reverse direction is the rotational direction of the motor to output the rotational direction detected signal.

In certain embodiments, when the commutation signal of the motor leads the electromotive force detected signal and the phase angle difference between the back electromotive force detected signal and the commutation signal is equal to a difference between 180 degrees and a preset angle, the forward and reverse rotation detecting circuit determines that the motor rotates in the reverse direction.

In certain embodiments, when the commutation signal leads the electromotive force detected signal and the phase angle difference between the back electromotive force detected signal and the commutation signal is equal to a preset angle, the forward and reverse rotation detecting circuit determines that the motor rotates in the forward direction.

In certain embodiments, the forward and reverse rotation detecting circuit is connected to a motor driving circuit. The motor driving circuit is configured to start up or drive the motor according to the rotational direction detected signal from the forward and reverse rotation detecting circuit.

In another aspect, the present disclosure provides a motor driver. The motor driver includes the motor forward and reverse rotation detector described above, and a motor driving circuit. The motor driving circuit includes a control circuit, a driver circuit and an output circuit. The control circuit is connected to the forward and reverse rotation detecting circuit. The control circuit is configured to output a control signal according to the rotational direction detected signal. The driver circuit is connected to the control circuit. The driver circuit is configured to output a driving signal according to the control signal. The output circuit is connected to the driver circuit. The output circuit is configured to output an output stage signal to the motor according to the driving signal.

As described above, the present disclosure provides the motor forward and reverse rotation detector and the motor driver having the motor forward and reverse rotation detector. The motor forward and reverse rotation detector of the present disclosure determines which one of the forward direction and the reverse direction is the rotational direction of the motor. The motor driving circuit determines operations performed on the motor according to the rotational direction of the motor. For example, when the motor driving circuit starts up the motor to rotate in the reverse direction against wind, the motor driving circuit brakes the motor. Conversely, when motor driving circuit starts up the motor to rotate in the forward direction toward which the wind blows, the motor driving circuit directly drives the motor to rotate normally.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
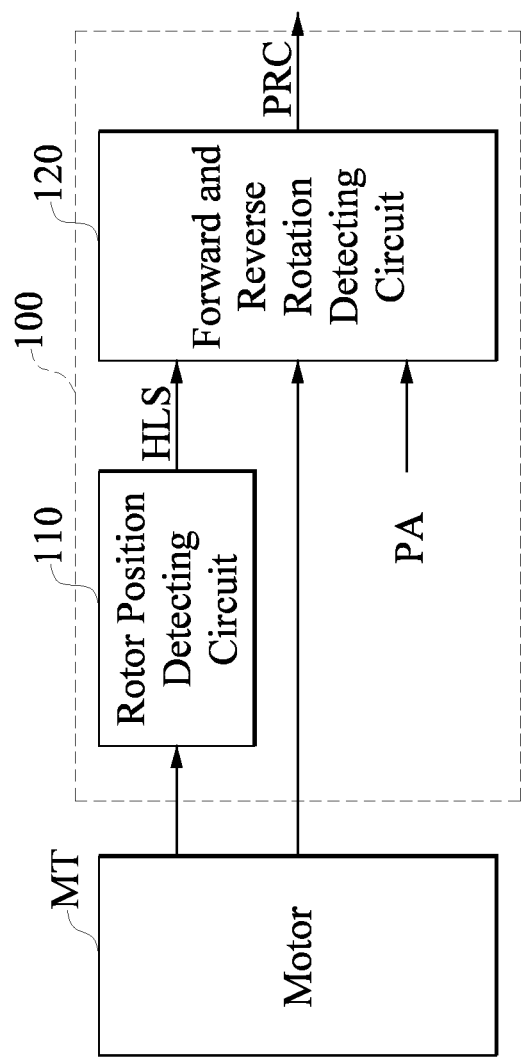
FIG. 1 is a block diagram of a motor forward and reverse rotation detector according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a block diagram of a motor forward and reverse rotation detector according to an embodiment of the present disclosure.

A motor forward and reverse rotation detector 100 of the embodiment of the present disclosure is applicable for detection of a motor MT.

The motor forward and reverse rotation detector 100 of the embodiment of the present disclosure may include a rotor position detecting circuit 110 and a forward and reverse rotation detecting circuit 120.

The rotor position detecting circuit 110 may be disposed on the motor MT or disposed adjacent to the motor MT. The rotor position detecting circuit 110 may be connected to the forward and reverse rotation detecting circuit 120. The rotor position detecting circuit 110 may instantly detect a position of a rotor of the motor MT. Then, the rotor position detecting circuit 110 may, according to the position of the rotor of the motor MT, determine a commutation state of the motor MT to output a commutation signal HLS to the forward and reverse rotation detecting circuit 120.

The forward and reverse rotation detecting circuit 120 may be connected to the motor MT. The forward and reverse rotation detecting circuit 120 may detect a back electromotive force signal of the motor MT to generate a back electromotive force detected signal.

The forward and reverse rotation detecting circuit 120 may, according to a phase relationship (for example, the back electromotive force detected signal leads or lags the commutation signal HLS) and a phase angle difference between the back electromotive force detected signal and the commutation signal HLS, determine which one of a forward direction and a reverse direction is a rotational direction of the motor MT to output a rotational direction detected signal PRC.

Figure 2:
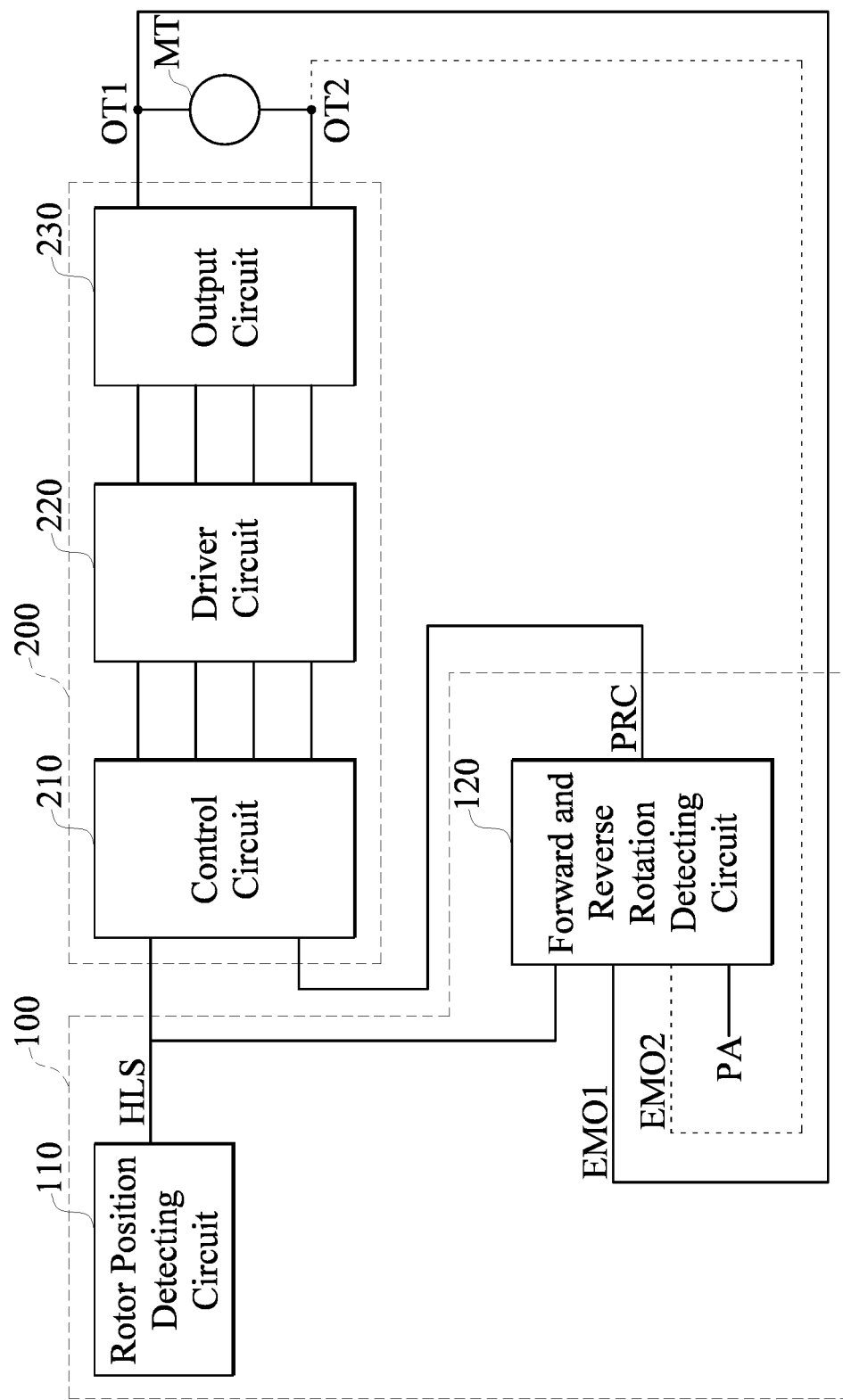
FIG. 2 is a block diagram of a motor driver having the motor forward and reverse rotation detector according to the embodiment of the present disclosure.
Figure 3:
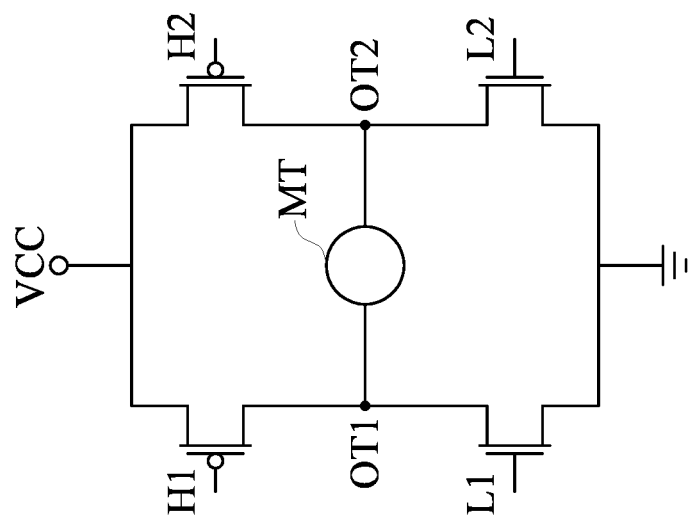
FIG. 3 is a circuit diagram of an output circuit of the motor driver and a single-phase motor detected by the motor forward and reverse rotation detector according to the embodiment of the present disclosure.

Reference is made to FIGS. 1 to 3, in which FIG. 2 is a block diagram of a motor driver having the motor forward and reverse rotation detector according to the embodiment of the present disclosure, and FIG. 3 is a circuit diagram of an output circuit of the motor driver and a single-phase motor detected by the motor forward and reverse rotation detector according to the embodiment of the present disclosure.

The motor driver of the embodiment of the present disclosure may include the motor forward and reverse rotation detector 100 as shown in FIGS. 1 and 2, and a motor driving circuit 200 as shown in FIG. 2. The motor forward and reverse rotation detector 100 is connected to the motor driving circuit 200. The motor driving circuit 200 is connected to the motor MT.

As shown in FIG. 2, the motor driving circuit 200 may include a control circuit 210, a driver circuit 220 and an output circuit 230. The control circuit 210 of the motor driving circuit 200 may be connected to the rotor position detecting circuit 110 and the forward and reverse rotation detecting circuit 120 of the motor forward and reverse rotation detector 100.

In the motor driving circuit 200, the control circuit 210 is connected to the driver circuit 220, and the driver circuit 220 is connected to the output circuit 230. The output circuit 230 is connected to the motor MT.

For example, the output circuit 230 of the motor driving circuit 200 shown in FIG. 2 may include a plurality of switch components such as a first high-side switch H1, a second high-side switch H2, a first low-side switch L1 and a second low-side switch L2 as shown in FIG. 3, but the present disclosure is not limited thereto. In practice, the output circuit 230 of the motor driving circuit 200 may include more high-side switches and more low-side switches.

As shown in FIG. 3, a first terminal of the first high-side switch H1 is coupled to a common voltage VCC. A second terminal of the first high-side switch H1 is connected to a first terminal of the first low-side switch L1. A second terminal of the first low-side switch L1 is grounded. A node between the second terminal of the first high-side switch H1 and the first terminal of the first low-side switch L1 is connected to a first terminal OT1 of the motor MT. A control terminal of the first high-side switch H1 and a control terminal of the first low-side switch L1 may be connected to an output terminal of the driver circuit 220.

A first terminal of the second high-side switch H2 is coupled to the common voltage VCC. A second terminal of the second high-side switch H2 is connected to a first terminal of the second low-side switch L2. A second terminal of the second low-side switch L2 is grounded. A node between the second terminal of the second high-side switch H2 and the first terminal of the second low-side switch L2 is connected to a second terminal OT2 of the motor MT. A control terminal of the second high-side switch H2 and a control terminal of the second low-side switch L2 may be connected to the output terminal of the driver circuit 220.

It is worth noting that, the motor forward and reverse rotation detector 100 may determine which one of the forward direction and the reverse direction is the rotational direction of the motor MT, and may determine operations performed on the motor MT, in particular to a starting operation, according to the rotational direction of the motor MT, as described in detail in the following.

The rotor position detecting circuit 110 of the motor forward and reverse rotation detector 100 may detect the position of the rotor of the motor MT. The rotor position detecting circuit 110 may, according to the position of the rotor of the motor MT, determine the commutation state of the motor MT to output the commutation signal HLS of the motor MT. At the same time, the forward and reverse rotation detecting circuit 120 of the motor forward and reverse rotation detector 100 may detect the back electromotive force signals of one or more (output) terminals of the motor MT to generate the back electromotive force detected signal.

For example, as shown in FIGS. 2 and 3, the forward and reverse rotation detecting circuit 120 may detect one or both of a back electromotive force signal EMO1 of the first terminal OT1 of the motor MT (such as the single-phase motor) and a back electromotive force signal EMO2 of the second terminal OT2 of the motor MT to generate the back electromotive force detected signal.

The forward and reverse rotation detecting circuit 120 may, according to the phase relationship and the phase angle difference between the back electromotive force detected signal and the commutation signal HLS, determine which one of the forward direction and the reverse direction is the rotational direction of the motor MT to output the rotational direction detected signal PRC.

The control circuit 210 of the motor driving circuit 200, according to the rotational direction detected signal PRC from the forward and reverse rotation detecting circuit 120 (and the commutation signal HLS or the position of the rotor of the motor MT from the rotor position detecting circuit 110), determine the operations performed on the motor MT to output one or more control signals.

The driver circuit 220 of the motor driving circuit 200 outputs one or more driving signals according to the one or more control signals from the control circuit 210. The output circuit 230 of the motor driving circuit 200 (including the plurality of switch components such as the first high-side switch H1, the second high-side switch H2, the first low-side switch L1 and the second low-side switch L2) operates to output one or more output stage signals to the motor MT to start up or drive the motor MT to rotate, according to the one or more driving signals.

Figure 4:
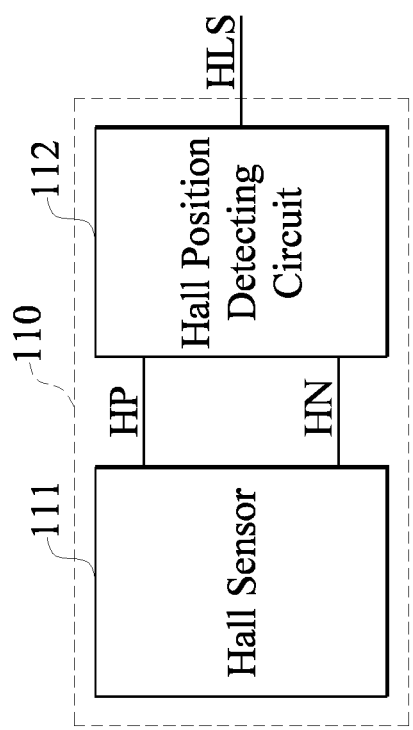
FIG. 4 is a block diagram of a rotor position detecting circuit of the motor forward and reverse rotation detector according to the embodiment of the present disclosure.

Reference is made to FIGS. 2 and 4, in which FIG. 4 is a block diagram of a rotor position detecting circuit of the motor forward and reverse rotation detector according to the embodiment of the present disclosure.

For example, the rotor position detecting circuit 110 shown in FIG. 2 may include a Hall sensor 111 and a Hall position detecting circuit 112 as shown in FIG. 4, but the present disclosure is not limited thereto.

The Hall sensor 111 shown in FIG. 4 may be disposed on the motor MT shown in FIG. 2 or disposed adjacent to the motor MT. The Hall sensor 111 may sense a positive voltage and a negative voltage that are generated with a change in magnetic field strength from rotation of the rotor of the motor MT to respectively output a first Hall signal HP and a second Hall signal HN.

As shown in FIG. 4, the Hall sensor 111 may be connected to the Hall position detecting circuit 112. The Hall position detecting circuit 112 shown in FIG. 4 may be further connected to the forward and reverse rotation detecting circuit 120 (and the motor driving circuit 200) shown in FIG. 2.

As shown in FIG. 4, the Hall position detecting circuit 112 may determine the position of the rotor of the motor MT, according to phases of the first Hall signal HP and the second Hall signal HN from the Hall sensor 111. The Hall position detecting circuit 112 shown in FIG. 4 may, according to the position of the rotor of the motor MT, determine the commutation state of the motor MT to output the commutation signal HLS to the forward and reverse rotation detecting circuit 120 (and the motor driving circuit 200) as shown in FIG. 2.

The forward and reverse rotation detecting circuit 120 may output the rotational direction detected signal PRC, according to the phase relationship and the phase angle difference between the back electromotive force detected signal and the commutation signal HLS of the motor MT. The motor driving circuit 200 starts up or drives the motor MT to rotate, according to the rotational direction detected signal PRC from the forward and reverse rotation detecting circuit 120 (and the commutation signal HLS or the position of the rotor of the motor MT from the rotor position detecting circuit 110).

Figure 5:
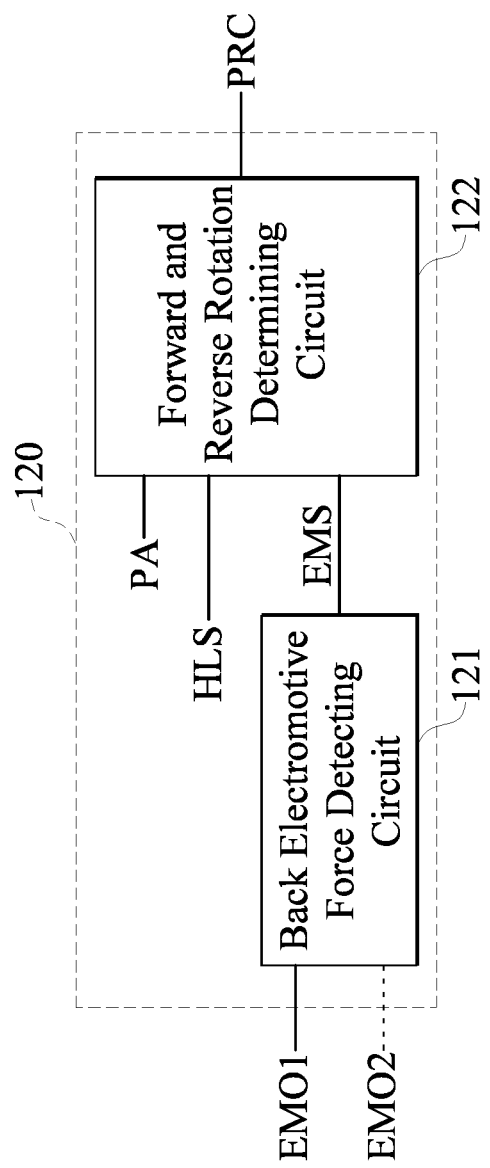
FIG. 5 is a block diagram of a forward and reverse rotation detecting circuit of the motor forward and reverse rotation detector according to the embodiment of the present disclosure.

Reference is made to FIGS. 2 and 5, in which FIG. 5 is a block diagram of a forward and reverse rotation detecting circuit of the motor forward and reverse rotation detector according to the embodiment of the present disclosure.

For example, the forward and reverse rotation detecting circuit 120 shown in FIG. 2 may include a back electromotive force detecting circuit 121 and a forward and reverse rotation determining circuit 122 as shown in FIG. 5, but the present disclosure is not limited thereto.

An input terminal of the back electromotive force detecting circuit 121 of the forward and reverse rotation detecting circuit 120 as shown in FIG. 5 is connected to one or both of the first terminal OT1 of the motor MT and the second terminal OT2 of the motor MT as shown in FIG. 2. As shown in FIG. 5, in the forward and reverse rotation detecting circuit 120, an output terminal of the back electromotive force detecting circuit 121 is connected to an input terminal of the forward and reverse rotation determining circuit 122.

In addition, the input terminal of the forward and reverse rotation determining circuit 122 as shown in FIG. 5 may be connected to an output terminal of the rotor position detecting circuit 110 as shown in FIG. 2 or an output terminal of the Hall position detecting circuit 112 of the rotor position detecting circuit 110 as shown in FIG. 4.

In the embodiment, the Hall position detecting circuit 112 may detect one or more of the back electromotive force signals of the one or more (output) terminals of the motor MT to output the back electromotive force detected signal. For example, as shown in FIGS. 2 and 5, the Hall position detecting circuit 112 may detect one or both of the back electromotive force signal EMO1 of the first terminal OT1 of the motor MT and the back electromotive force signal EMO2 of the second terminal OT2 of the motor MT to output a back electromotive force detected signal EMS.

The forward and reverse rotation determining circuit 122 may, according to the phase relationship and the phase angle difference between the back electromotive force detected signal EMS from the back electromotive force detecting circuit 121 and the commutation signal HLS from (the Hall position detecting circuit 112 of) the rotor position detecting circuit 110, determine which one of the forward direction and the reverse direction is the rotational direction of the motor MT to output the rotational direction detected signal PRC.

The motor driving circuit 200 starts up or drives the motor MT to rotate, according to the rotational direction detected signal PRC from the forward and reverse rotation determining circuit 122 (and the commutation signal HLS or the position of the rotor of the motor MT from the rotor position detecting circuit 110).

Figure 6:
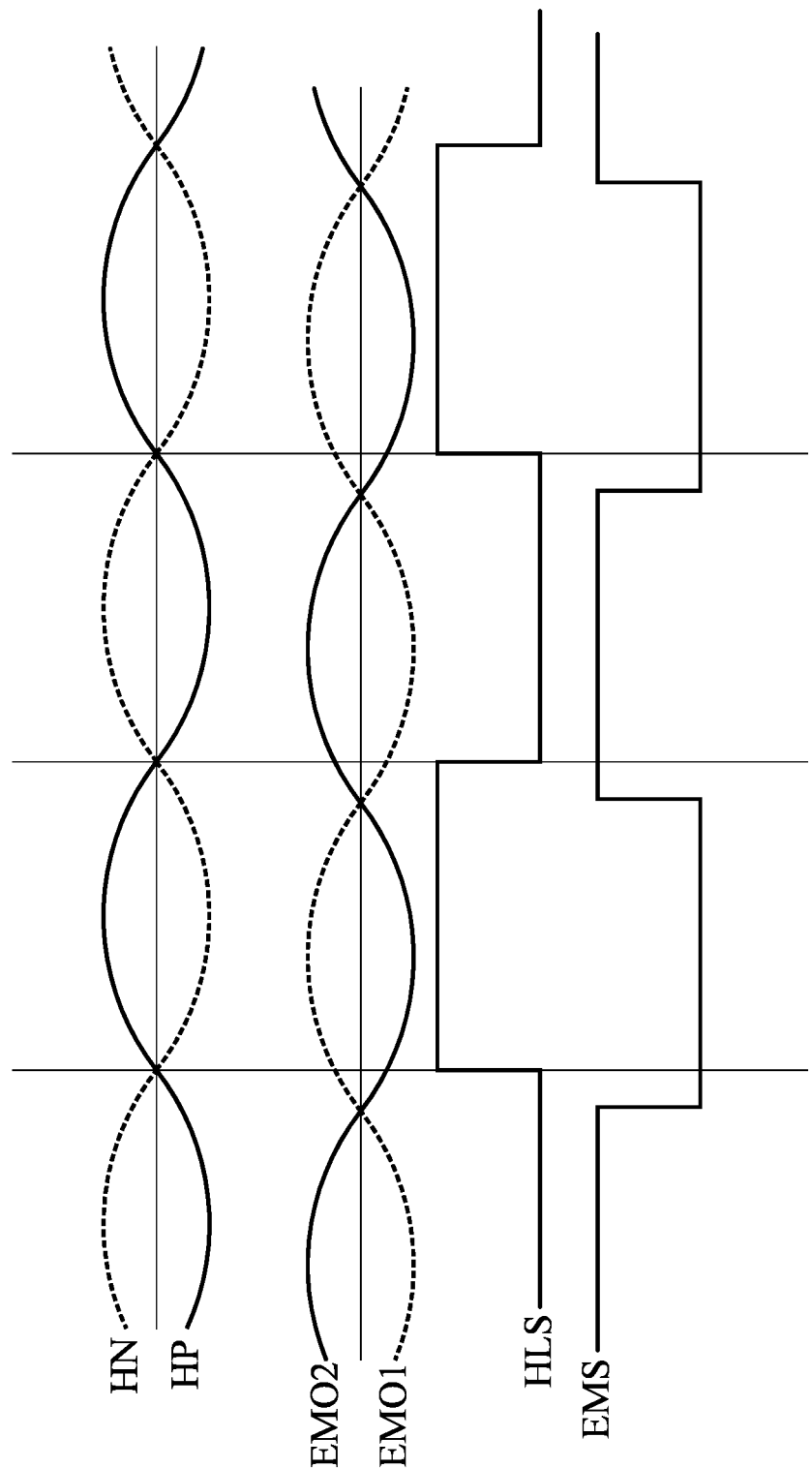
FIG. 6 is a waveform diagram of signals outputted by the motor forward and reverse rotation detector determining that the motor rotates in a reverse direction according to the embodiment of the present disclosure.
Figure 7:
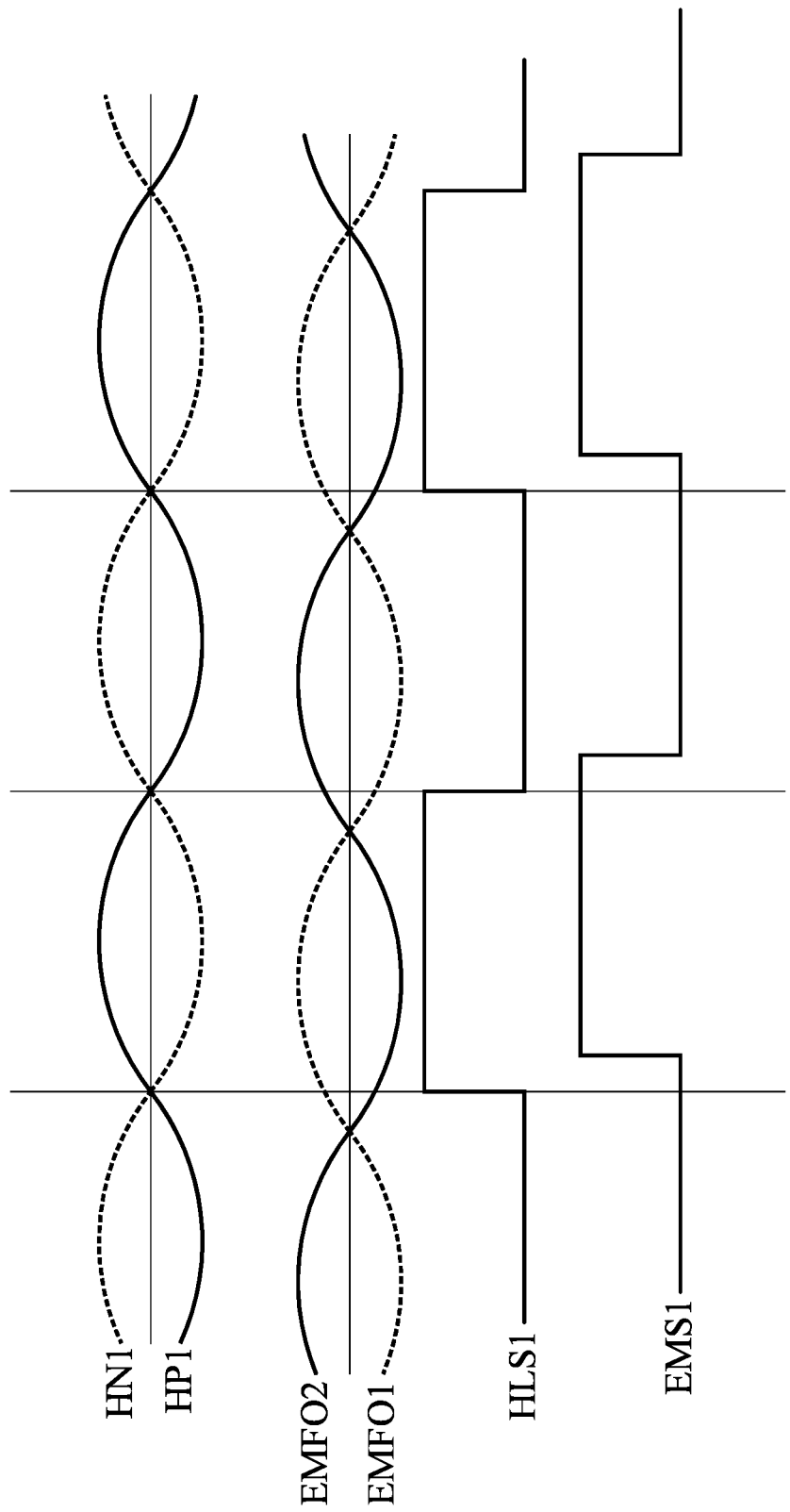
FIG. 7 is a waveform diagram of signals outputted by the motor forward and reverse rotation detector determining that the motor rotates in a forward direction according to the embodiment of the present disclosure.

Reference is made to FIGS. 1 to 7, in which FIG. 6 is a waveform diagram of signals outputted by the motor forward and reverse rotation detector determining that the motor rotates in the reverse direction according to the embodiment of the present disclosure, and FIG. 7 is a waveform diagram of signals outputted by the motor forward and reverse rotation detector determining that the motor rotates in the forward direction according to the embodiment of the present disclosure.

The Hall sensor 111 of the rotor position detecting circuit 110 senses Hall signals such as the first Hall signal HP and the second Hall signal HN as shown in FIG. 6 or a first Hall signal HP1 and a second Hall signal HN1 as shown in FIG. 7.

The Hall position detecting circuit 112 of the rotor position detecting circuit 110 may output the commutation signal HLS as shown in FIG. 6, according to the first Hall signal HP and the second Hall signal HN as shown in FIG. 6. Alternatively, the Hall position detecting circuit 112 of the rotor position detecting circuit 110 may output a commutation signal HLS1 as shown in FIG. 7, according to the first Hall signal HP1 and the second Hall signal HN1 as shown in FIG. 7.

The back electromotive force detecting circuit 121 of the forward and reverse rotation detecting circuit 120 senses the back electromotive force signals such as the back electromotive force signals EMO1 and EMO2 as shown in FIG. 6 or back electromotive force signals EMFO1 and EMFO2 as shown in FIG. 7.

The back electromotive force detecting circuit 121 of the forward and reverse rotation detecting circuit 120 outputs the back electromotive force detected signal EMS as shown in FIG. 6, according to the back electromotive force signals EMO1 and EMO2 as shown in FIG. 6. Alternatively, the back electromotive force detecting circuit 121 of the forward and reverse rotation detecting circuit 120 outputs a back electromotive force detected signal EMS1 as shown in FIG. 7, according to the back electromotive force signals EMFO1 and EMFO2 as shown in FIG. 7.

The forward and reverse rotation determining circuit 122 of the forward and reverse rotation detecting circuit 120 may, according to the phase relationship and the phase angle difference between the back electromotive force detected signal EMS and the commutation signal HLS as shown in FIG. 6 or between the back electromotive force detected signal EMS1 and the commutation signal HLS1 as shown in FIG. 7, determine which one of the forward direction and the reverse direction is the rotational direction of the motor MT to output the rotational direction detected signal PRC.

For example, as shown in FIG. 6, the commutation signal HLS leads the electromotive force detected signal EMS, and the phase angle difference between the back electromotive force detected signal EMS and the commutation signal HLS is equal to a difference between 180 degrees and a preset angle PA. Under this condition, the forward and reverse rotation determining circuit 122 of the forward and reverse rotation detecting circuit 120 determines that the motor MT rotates in the reverse direction to output the rotation direction detected signal PRC having a motor reverse rotation message. When the motor driving circuit 200 determines that the motor MT is started up or is driven to rotate in the reverse direction according to the motor reverse rotation message of the rotation direction detected signal PRC from the forward and reverse rotation determining circuit 122 of the forward and reverse rotation detecting circuit 120, the motor driving circuit 200 brakes the motor MT and reduces rotational speed of the motor MT.

Conversely, as shown in FIG. 7, the commutation signal HLS1 leads the electromotive force detected signal EMS1, and the phase angle difference between the back electromotive force detected signal EMS1 and the commutation signal HLS1 is equal to the preset angle PA. Under this condition, the forward and reverse rotation determining circuit 122 of the forward and reverse rotation detecting circuit 120 determines that the motor MT rotates in the forward direction to output the rotation direction detected signal PRC having a motor forward rotation message. The motor driving circuit 200 starts up or drives the motor to rotate normally, according to the motor forward rotation message of the rotation direction detected signal PRC from the forward and reverse rotation determining circuit 122 of the forward and reverse rotation detecting circuit 120.

Beneficial Effects of the Embodiments

In conclusion, the present disclosure provides the motor forward and reverse rotation detector and the motor driver having the motor forward and reverse rotation detector. The motor forward and reverse rotation detector of the present disclosure determines which one of the forward direction and the reverse direction is the rotational direction of the motor. The motor driving circuit determines the operations performed on the motor according to the rotational direction of the motor. For example, when the motor driving circuit starts up the motor to rotate in the reverse direction against the wind, the motor driving circuit brakes the motor. Conversely, when motor driving circuit starts up the motor to rotate in the forward direction toward which the wind blows, the motor driving circuit directly drives the motor to rotate normally.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor forward and reverse rotation detector, which is applicable for detection of a motor, comprising:
    a rotor position detecting circuit disposed on the motor, and configured to detect a position of a rotor of the motor to output a commutation signal; and
    a forward and reverse rotation detecting circuit connected to the rotor position detecting circuit and the motor, and configured to detect a back electromotive force signal to generate a back electromotive force detected signal, wherein the forward and reverse rotation detecting circuit, according to a phase relationship and a phase angle difference between the back electromotive force detected signal and the commutation signal, determines which one of a forward direction and a reverse direction is a rotational direction of the motor to output a rotational direction detected signal;
    wherein, when the commutation signal leads the electromotive force detected signal, and the phase angle difference between the back electromotive force detected signal and the commutation signal is equal to a preset angle, the forward and reverse rotation detecting circuit determines that the motor rotates in the forward direction.

2. The motor forward and reverse rotation detector according to claim 1, wherein the forward and reverse rotation detecting circuit detects the back electromotive force signal of one or more of a plurality of terminals of the motor to generate the back electromotive force detected signal.

3. The motor forward and reverse rotation detector according to claim 2, wherein the motor is a single-phase motor and the plurality of terminals of the motor includes a first terminal and a second terminal.

4. The motor forward and reverse rotation detector according to claim 1, wherein the rotor position detecting circuit includes:
    a Hall sensor disposed on the motor, and configured to sense a positive voltage and a negative voltage that are generated with a change in magnetic field strength from rotation of the rotor of the motor to respectively output a first Hall signal and a second Hall signal; and
    a Hall position detecting circuit connected to the Hall sensor and the forward and reverse rotation detecting circuit, and configured to output the commutation signal to the forward and reverse rotation detecting circuit according to the first Hall signal and the second Hall signal.

5. The motor forward and reverse rotation detector according to claim 1, wherein the forward and reverse rotation detecting circuit includes:
    a back electromotive force detecting circuit connected to the motor, and configured to detect the back electromotive force signal to output the back electromotive force detected signal; and
    a forward and reverse rotation determining circuit connected to the back electromotive force detecting circuit, wherein the forward and reverse rotation determining circuit, according to the phase relationship and the phase angle difference between the back electromotive force detected signal and the commutation signal, determines which one of the forward direction and the reverse direction is the rotational direction of the motor to output the rotational direction detected signal.

6. The motor forward and reverse rotation detector according to claim 1, wherein, when the commutation signal of the motor leads the electromotive force detected signal, and the phase angle difference between the back electromotive force detected signal and the commutation signal is equal to a difference between 180 degrees and the preset angle, the forward and reverse rotation detecting circuit determines that the motor rotates in the reverse direction.

7. The motor forward and reverse rotation detector according to claim 1, wherein the forward and reverse rotation detecting circuit is connected to a motor driving circuit, and the motor driving circuit is configured to start up or drive the motor according to the rotational direction detected signal from the forward and reverse rotation detecting circuit.

8. A motor driver having a motor forward and reverse rotation detector, comprising:
    a rotor position detecting circuit disposed on the motor, and configured to detect a position of a rotor of the motor to output a commutation signal;
    a forward and reverse rotation detecting circuit connected to the rotor position detecting circuit and the motor and configured to detect a back electromotive force signal to generate a back electromotive force detected signal, wherein the forward and reverse rotation detecting circuit, according to a phase relationship and a phase angle difference between the back electromotive force detected signal and the commutation signal, determines which one of a forward direction and a reverse direction is a rotational direction of the motor to output a rotational direction detected signal; and
    a motor driving circuit, including:

a control circuit connected to the forward and reverse rotation detecting circuit, and configured to output a control signal according to the rotational direction detected signal;

a driver circuit connected to the control circuit and configured to output a driving signal according to the control signal; and an output circuit connected to the driver circuit and configured to output an output stage signal to the motor according to the driving signal;

wherein, when the commutation signal leads the electromotive force detected signal, and the phase angle difference between the back electromotive force detected signal and the commutation signal is equal to a preset angle, the forward and reverse rotation detecting circuit determines that the motor rotates in the forward direction.

9. The motor driver according to claim 8, wherein the forward and reverse rotation detecting circuit detects the back electromotive force signal of one or more of a plurality of terminals of the motor to generate the back electromotive force detected signal.

10. The motor driver according to claim 9, wherein the motor is a single-phase motor, and the plurality of terminals of the motor includes a first terminal and a second terminal.

11. The motor driver according to claim 8, wherein the rotor position detecting circuit includes:

a Hall sensor disposed on the motor, and configured to sense a positive voltage and a negative voltage that are generated with a change in magnetic field strength from rotation of the rotor of the motor to respectively output a first Hall signal and a second Hall signal; and a Hall position detecting circuit connected to the Hall sensor and the forward and reverse rotation detecting circuit, and configured to output the commutation signal to the forward and reverse rotation detecting circuit according to the first Hall signal and the second Hall signal.

12. The motor driver according to claim 8, wherein the forward and reverse rotation detecting circuit includes:

a back electromotive force detecting circuit connected to the motor, and configured to detect the back electromotive force signal to output the back electromotive force detected signal; and a forward and reverse rotation determining circuit connected to the back electromotive force detecting circuit, wherein the forward and reverse rotation determining circuit, according to the phase relationship and the phase angle difference between the back electromotive force detected signal and the commutation signal, determines which one of the forward direction and the reverse direction is the rotational direction of the motor to output the rotational direction detected signal.

13. The motor driver according to claim 8, wherein, when the commutation signal of the motor leads the electromotive force detected signal, and the phase angle difference between the back electromotive force detected signal and the commutation signal is equal to a difference between 180 degrees and the preset angle, the forward and reverse rotation detecting circuit determines that the motor rotates in the reverse direction.

* * * * *